United States Patent [19]

Sasaki et al.

[11] 4,102,980

[45] Jul. 25, 1978

[54] METHOD FOR REMOVAL OF DUST DEPOSITED ON CONTACT APPARATUS INTERIOR

[75] Inventors: Takashi Sasaki; Michio Saima, both of Yokohama, Japan

[73] Assignee: Japan Gasoline Co., Ltd., Tokyo, Japan

[21] Appl. No.: 725,839

[22] Filed: Sep. 23, 1976

[30] Foreign Application Priority Data

Sep. 25, 1975 [JP] Japan .................................. 50-114903

[51] Int. Cl.² .............................................. B01J 37/00
[52] U.S. Cl. ................................... 423/239; 423/244; 423/659; 423/DIG. 13; 23/288 B; 252/411 R; 23/288 F
[58] Field of Search ............... 423/212, 239, 242, 284, 423/659; 23/288; 134/7; 252/411 R; 51/319, 320, 321; 165/95; 15/3.5

[56] References Cited

U.S. PATENT DOCUMENTS

| 1,052,191 | 2/1913 | Trott | 51/320 |
|---|---|---|---|
| 3,939,613 | 2/1976 | Ayers | 51/320 |
| 3,966,892 | 6/1976 | Okudaira et al. | 423/613 |
| 3,981,685 | 9/1976 | Fennessy | 23/288 F |
| 4,003,711 | 1/1977 | Hishunuma et al. | 23/288 B |

FOREIGN PATENT DOCUMENTS

| 27,596 | 3/1964 | German Democratic Rep. | 252/411 |
|---|---|---|---|
| 864,490 | 4/1961 | United Kingdom | 252/411 |
| 1,209,184 | 10/1970 | United Kingdom | 165/95 |

*Primary Examiner*—G. O. Peters
*Attorney, Agent, or Firm*—Stevens, Davis, Miller & Mosher

[57] ABSTRACT

During use of a contact apparatus to remove harmful components, such as sulfur and nitrogen oxides, from waste gas, dust particles are deposited on the interior of the gas-solid contact zone and reduce efficiency of the apparatus. The dust particles can be removed by passing through the contact apparatus a current of a carrier gas supporting solid particles of, for example, siliceous sand. The particles have a diameter of 50 to 2000 μm and the actual linear velocity of the carrier gas in the gas-solid contact zone is from 2 to 15 m/sec. The carrier gas can be the waste gas itself so that dust removal can be carried out without interrupting use of the apparatus. The solid particles can be removed from the carrier gas and recycled for further dust removal.

21 Claims, 8 Drawing Figures

METHOD FOR REMOVAL OF DUST DEPOSITED ON CONTACT APPARATUS INTERIOR

BACKGROUND OF THE INVENTION

This invention relates to a method for the removal of dust deposited on the interior of the contact apparatus employed for the removal of harmful components such as sulfur oxides and nitrogen oxides from waste gas.

Generally, waste gases from stationary sources such as combustion furnaces, incinerating furnaces and sintering furnaces contain various oxides such as $V_2O_5$, $Na_2O$, $Fe_2O_3$, $Al_2O_3$, $CaO$, $SiO_2$, $NiO$ and $SO_3$ and carbon and other dust components in significant quantities as well as such harmful components as sulfur oxides and nitrogen oxides. If a waste gas of such nature is passed through a contact apparatus, particularly a packed-bed type contact apparatus, for the removal of such harmful components, then the dust components described above are deposited on the surface of solid materials including the active components in the contact apparatus, such as, for example, adsorbents for sulfur oxides and catalysts for conversion of nitrogen oxides and others into unharmful compounds, and to the inner wall surface of the contact apparatus, thus gradually increasing the pressure drop or degrading the efficiency of removal of harmful components. Thus, it is extremely difficult for the contact apparatus to be effectively operated on a commercial scale.

As a measure for avoiding the undesirable effects of such dust components, there has been suggested a method which comprises subjecting the influent waste gas to treatment with an electrostatic dust precipitator or scrubber for removal of the dust components in advance. This method proves to be expensive in terms of equipment and operation. If the operation happens to involve a scrubbing treatment or some other similar treatment, then the temperature of the waste gas is greatly lowered. The cooled waste gas must then be heated up to at least the temperature it had before dust removal, more specifically to the temperature suitable for removal of harmful components, so as to be effectively treated in the contact apparatus.

There has also been proposed a method for preventing deposition of dust components as much as possible by improving the internal structure of the contact apparatus, namely by providing the interior of the contact apparatus with regularly arranged flow spaces adapted to cause the current of gas to flow in one fixed direction. If such an arrangement is used, the dust components invariably deposit on the wall surfaces defining the flow spaces, after the contact apparatus has been used for a long time, though not so heavily as in the operation of the packed-bed type contact apparatus.

Numerous techniques have so far been proposed for preventing dust components from depositing on the interior of contact apparatus, as described above. However, there has never been developed a technique capable of effectively removing such dust components which have already been deposited on the inside of the contact apparatus. Virtually no study has heretofore been made in search of a technique for effective removal of the dust components of the type suffered to deposit on the interior of contact apparatus while said contact apparatus is being operated under normal conditions in a process for the removal of harmful components contained in a waste gas.

SUMMARY OF THE INVENTION

It is an object of the present invention to provide a method of effectively removing dust components which have deposited on the interior of a contact apparatus of the type described above. It is a further object of the present invention to provide a method whereby such dust components may be removed from the interior of a contact apparatus while the contact apparatus is being operated under normal conditions for the removal of harmful components contained in a waste gas.

The method of the invention comprises allowing solid particles of an average particle diameter of 50 to 2000 $\mu$m to flow in free motion through the interior of the contact apparatus in a current of a carrier gas and controlling the actual linear velocity of the carrier gas within the gas-solid contact zone of the contact apparatus in the range of 2 to 15 m/sec.

The said contact apparatus has a gas-solid contact zone having a plurality of parallel gas channels formed between a plurality of solid bodies which contain an active component for removing harmful components from said waste gas.

DETAILED DESCRIPTION OF THE INVENTION

Figure 1:
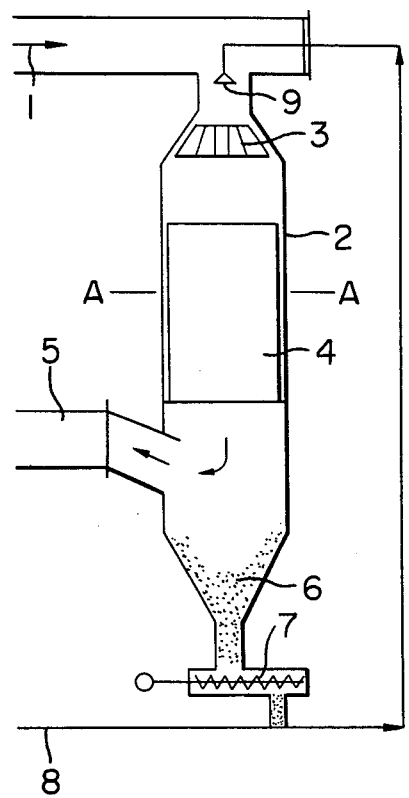
FIGS. 1 and 2 are schematic views showing typical contact apparatus used in the present invention.

The "process for the removal of harmful components from a waste gas" to which the present invention is applied may be, for example, a dry process designed to remove sulfur oxides, a dry process designed to remove nitrogen oxides or a dry process designed to remove sulfur oxides and nitrogen oxides at the same time. It may also be any other process which is basically intended to effect removal of harmful components contained in a waste gas and which happens to be of a type necessitating removal of dust components deposited inside the contact apparatus.

A typical example of contact apparatus which may be used in the present invention is the parallel passage type contact apparatus wherein the gas-solid contact zone has parallel gas channels formed between a plurality of solid bodies, each consisting of a gauze envelope of 9 to 48 Tyler mesh packed with solid materials including an active component. In this particular contact apparatus, the envelopes are typically in the shape of a rectangular parallelepiped or cylinder. The gas channels formed between the adjacent envelopes preferably have a width of from 3 to 20 mm. The thickness of these envelopes is preferably in a range from 3 to 10 mm.

Another typical contact apparatus is a honeycomb type contact apparatus wherein the gas-solid contact zone has gas channels formed by boring a plurality of parallel void spaces each of the shape of a column with a circular, square or polygonal cross-section through a structure in the shape of a cylindrical column or rectangular column and having an active component at least on the exposed bore surfaces. In this contact apparatus, the void spaces are desired to have a hydraulic diameter, from 3 to 20 mm.

In the selection of solid particles for use in the method of the present invention, due consideration should be paid to the particle diameter and physical properties thereof. According to the knowledge acquired by the present inventors, the solid particles to be used for the method of this invention are those having an average particle diameter in the range of from 50 to 2000 $\mu$m, preferably from 200 to 1000 $\mu$m. The term "average particle diameter" herein used denotes the mode diameter which is commonly accepted in the field of powder engineering. Furthermore, the selected solid particles are desired to have a density of from 0.9 to 8.0 g/cm$^3$, preferably from 1.0 to 3.1 g/cm$^3$, and exhibit ample mechanical strength. A typical solid substance which has such physical properties is siliceous sand. Any other solid substance may be adopted, however, insofar as it is possessed of such physical properties as described above.

As the carrier gas which is introduced into the contact apparatus with the solid particles in the method of the present invention, there can be used any gas which may be safely released into the atmosphere. In the method of this invention, however, the waste gas containing harmful components which subjected to treatment such that the dry process to remove sulfur oxides and/or nitrogen oxides can effectively be used as the carrier gas.

In the method of this invention, the actual linear velocity of the current of carrier gas in the gas-solid contact zone is to be from 2 to 15 m/sec, preferably from 8 to 13 m/sec. Generally, in order for the actual linear velocity of the current of carrier gas in the gas-solid contact zone to fall in said range, the actual linear velocity of the current of carrier gas at the point of entry into the contact apparatus needs to be from 10 to 30 m/sec thus making allowance for the pressure drop while leading to and in the gas-solid contact zone.

Further in the method of this invention, the proportion of the solid particles being introduced into the contact apparatus in relation to the carrier gas is desired to fall in the range of from 1 to 200 g/m$^3$, preferably from 20 to 100 g/m$^3$.

The schematic diagram of FIG. 1 of the accompanying drawings illustrates a typical apparatus employed in the practice of the method of this invention. The waste gas is introduced (generally at a linear velocity of 10 to 30 m/sec) via a line 1 into a contact apparatus 2. The waste gas is converted into a uniform current by a current distributor 3 disposed inside the contact apparatus 2. The current of waste gas is freed from harmful components while flowing down the gas-solid contact zone 4 and the treated waste gas is released into the atmosphere via a line 5. Over a long period of time, the dust components in the waste gas deposit on surfaces such as of the solid body within the gas-solid contact zone to a variable extent depending on such factors as particle diameter and composition of the dust components, temperature of the waste gas and actual linear velocity of the waste gas. Particularly in the case of the parallel passage type contact apparatus, the dust components gradually clog the mesh openings in the gauze envelopes, with the result that the required contact between the harmful components present in the influent waste gas and the solid materials including the active component is obstructed and the efficiency of removal of the harmful components is seriously reduced. Accordingly, it becomes necessary to remove the deposited dust components from said surface at appropriate intervals.

The method of this invention accomplishes the removal of deposited dust components by causing solid particles to be introduced at an inlet 9 and carried through the interior of the contact apparatus 2 by means of the current of the carrier gas. In this case, the deposited dust components are removed from the various internal surfaces by the fact that the solid particles continually collide with and rebound off the gauze or the packed solid materials. For this reason, the current of carrier gas serving to carry the solid particles is desired to be in a turbulent state, as defined in fluid dynamics, while travelling through the gas channels. In the performance of this invention, therefore, it is necessary that due attention should be exercised with respect to the selection of solid particles and the control of the actual linear velocity of the gas within the gas-solid contact zone.

It has been established as a result of experiment that the solid particles selected for use in the operation should have a size such that the average particle diameter falls within the range of from 50 to 2000 $\mu$m. If the average particle diameter exceeds the upper limit of 2000 $\mu$m, then the solid particles cannot acquire sufficient velocity for the desired collisions in the current of carrier gas. If the diameter does not reach the lower limit of 50 $\mu$m, then the energy of collision acquired by the individual solid particles is extremely small.

It has also been established experimentally that the actual linear velocity of the current of carrier gas in the gas-solid contact zone should be from 2 to 15 m/sec. If the actual linear velocity is below the lower limit of 2 m/sec, then the current of carrier gas no longer gives sufficient energy to the individual solid particles. If it exceeds the upper limit of 15 m/sec, no additional effect can be expected. Additionally, the increased velocity is likely to increase the velocity of the collision of the individual solid particles to such an extent as to cause erosion within the contact apparatus.

In the actual operation of the method of this invention, due attention should be paid to the density of solid particles and to the concentration of the solid particles with reference to the carrier gas. According to the knowledge acquired by the inventors, the density of the solid particles is desirably from 0.5 to 8.0 g/m$^3$ and the concentration of the solid particles to be from 1 to 200 g/m$^3$ of carrier gas.

Examples of suitable solid particles are particles of iron, glass, alumina, silica and siliceous sand.

The dust components which have been removed from the surfaces as described above are mostly withdrawn from the system via the line 5, although some of them are entrained by the effluent solid particles. When necessary, the dust components thus taken out of the system may be recovered by means of an electrostatic dust precipitator (not illustrated).

In the meanwhile, the solid particles settle into a hopper unit 6 disposed at the lower part of the contact apparatus 2. From the hopper unit, they are removed from the system by means of a screw conveyor 7, for example. The solid particles thus withdrawn can be recycled to the inlet 9 be being passed into a current of compressed gas introduced via a line 8 or into the compressed current of a part of the waste gas introduced via the line 1, for example.

It is to be noted that the treatment for removal of deposited dust components by the method of this invention can be carried out without interrupting the process for removal of harmful components from waste gas. A typical treatment frequency of this treatment is to carry out one treatment for a duration of about 15 minutes at intervals of one week to one month. Of course, the intervals and other similar operational conditions should be suitably selected depending on the attributes of the deposited dust. It is also possible to arrange for a small quantity of solid particles to be continuously passed through the interior of the contact apparatus at all times. If the circumstances require, the treatment may be carried out by using compressed air, for example, as the carrier gas while the aforementioned process is suspended temporarily for the purpose of this treatment.

Figure 2:
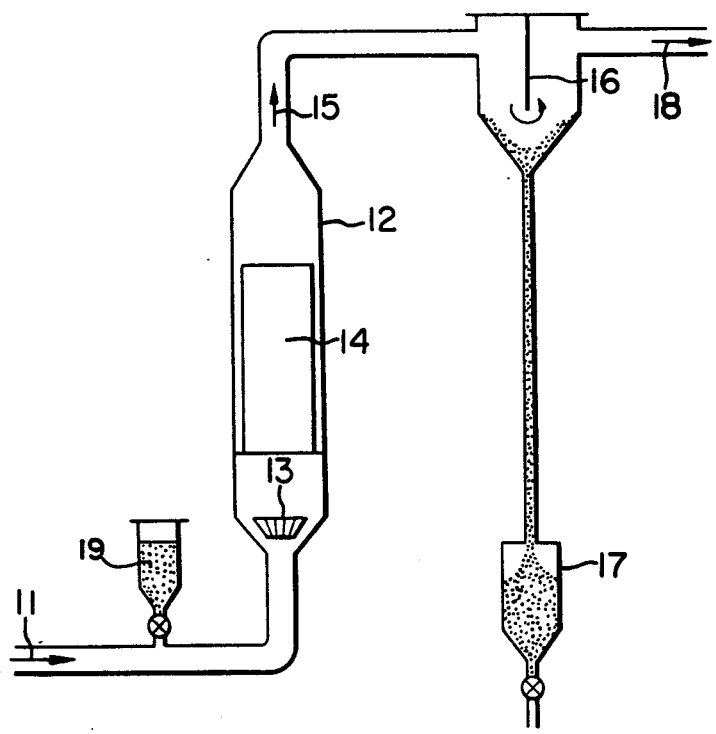

In the system shown in FIG. 2 of the accompanying drawings, the waste gas is introduced via a line 11 into contact apparatus 12. A current distributor 13 disposed inside the contact apparatus 12 causes the waste gas to flow in a uniform current. The waste gas then flows up the gas-solid contact zone 14, where the harmful components are removed, and the treated waste gas is released into the atmosphere via a line 18. In this particular preferred embodiment, the present invention is effected by continuously or batchwise introducing solid particles through a hopper 19 disposed in the waste gas inlet line 11. Eventually, these solid particles are collected by an ordinary gas-solid separation unit such as a baffle plate 16. The solid particles thus collected can be recycled from a solid particles reservoir 17 to the hopper 19 by suitable means.

In this type of contact apparatus, due consideration should be paid to the selection of the particle diameter and the density of the solid particles to be used.

Figure 3:
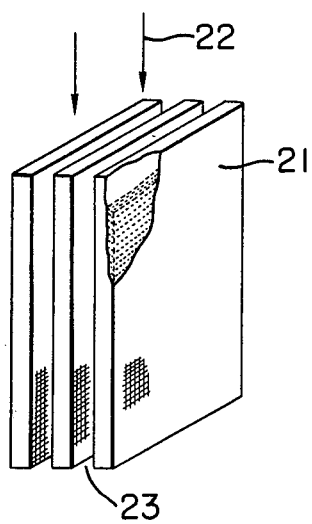
FIGS. 3 and 4 are schematic views of two forms of gas-solid contact zone used in a parallel passage type contact apparatus.
Figure 4:
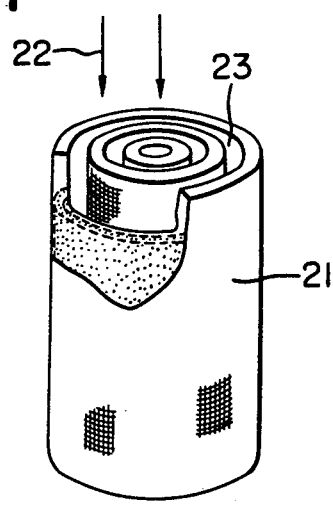

FIGS. 3 and 4 of the accompanying drawings are schematic diagrams each illustrating envelopes 21 forming the gas-solid contact zone in a parallel passage type contact apparatus and the direction 22 of the current of waste gas through said zone (in the embodiment shown in FIG. 1 the waste gas flows downwardly). The gas-solid contact zone is formed by arranging parallelly to and spaced from each other a plurality of elements each obtained by wrapping solid materials containing active components in a reticular material. The harmful components contained in the waste gas are rendered harmless while the waste gas is flowing through the gas channels formed between the envelopes.

Figure 5:
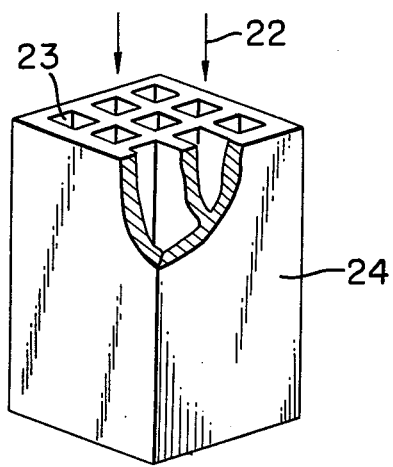
FIG. 5 is a schematic view of the gas-solid contact zone of a honey comb type contact apparatus.

FIG. 5 illustrates a typical structure 24 which forms the gas-solid contact zone in a honeycomb type contact apparatus. In this structure, the waste gas flows through the gas channels 23. This structure may be substituted by a structure obtained by bundling a plurality of pipes having a circular, square or polygonal cross-section.

Figure 6:
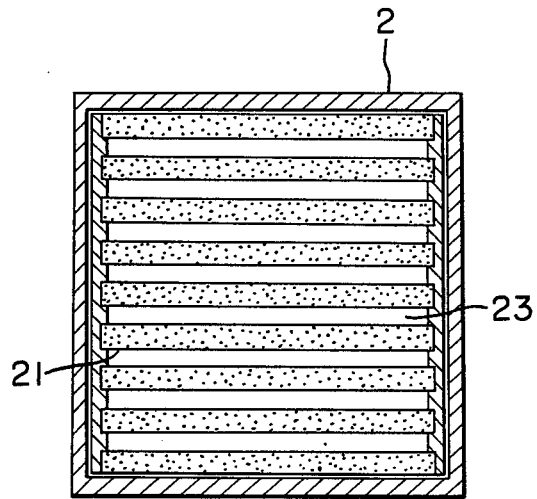
FIGS. 6, 7 and 8 are cross-sectional views of the structure of FIGS. 3, 4 and 5 respectively, each being set in position in the apparatus of FIG. 1, the cross-sections being taken on line A—A of FIG. 1.
Figure 7:
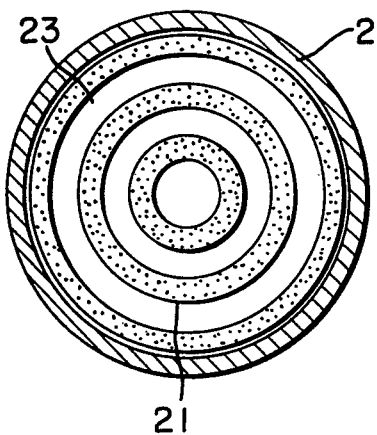
Figure 8:
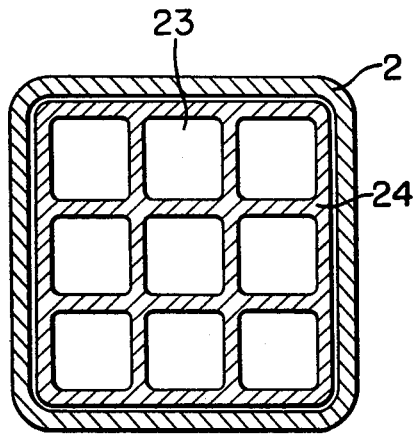

FIGS. 6, 7 and 8 illustrate the cross-sections of the structures of FIGS. 3, 4 and 5 respectively when said structures are each set in position in the gas-solid contact zone of the contact apparatus of FIG. 1, the cross-sections being taken along the line A—A indicated in FIG. 1.

Although preferred embodiments of the present invention have been described, these embodiments may be modified insofar as the modifications involved do not depart from the spirit and scope of the present invention as defined in the appended claims.

Now, the present invention will be described with reference to working examples of the method of the invention.

EXAMPLE 1

A gas mixture consisting of 354 $Nm^3/hr$ of waste gas at 300° C emanating from a boiler using heavy oil, the gas containing 200 ppm of nitrogen oxides and 1.2 mols, per mol of nitrogen oxides, of ammonia, added as reducing agent, was fed into a parallel passage type box-shaped contact apparatus 20 cm × 20 cm and 4 m in height so that the nitrogen oxides were reduced to harmless nitrogen. After this reduction process had been in progress for 25 days, it was found that the conversion of nitrogen oxides had fallen from the intial value of 93% to 80%. A siliceous sand having an average particle diameter of 700 $\mu$m and a density of 2.4 $g/cm^3$ was then introduced into the contact apparatus at a rate of 40 $g/m^3$ of the current of gas, with the actual linear velocity in the gas-solid contact zone kept at 12.2 m/sec. This treatment for the removal of dust was continued for 19 minutes. At the end of the treatment, the conversion of nitrogen oxides was found to have increased to 92%. The contact apparatus which was used in this example had a gas-solid contact zone with parallel gas channels formed therein by arranging at 12.2 mm intervals a total of 16 gas-solid contact bodies each in the shape of a rectangular parallelepiped 1000 mm in length, 200 mm in width and 5 mm in thickness. Each contact body was an envelope made of 12 × 24 Tyler gauze mesh containing a solid catalyst which was prepared by depositing ferrous sulfate as the active component on a silica-alumina carrier.

A test carried out to determine whether or not the siliceous sand particles used in the treatment for the removal of dust would be carried out of the system suspended in the effluent current of waste gas, revealed that the amount carried out in this way was less than 3%.

The same test under identical conditions was carried out for 25 days using another similar apparatus. The envelopes were taken out of the apparatus before and after the dust removal treatment and the conditions of dust deposition on the envelopes visually inspected. The inspection showed that virtually all dust components deposited on the envelopes were removed by the treatment.

As is evident from the working example described above, the method of this invention permits ready removal of dust deposited on the inside of the contact apparatus without interrupting the operation of the process for rendering harmful components of waste gas harmless. The removal of harmful components from waste gases containing large quantities of dust components such as those from boilers using coal and those from mineral ore sintering furnaces which has heretofore been accepted as an operation not practicable on a commercial scale, unless an electrostatic dust precipitator or some other similar apparatus is placed upstream of the contact apparatus, can now be carried out by the method of this invention at a substantially low cost. Furthermore, if the operation by the method of this invention is carried out so as to be finished in a short span of time, then possible effects contributory to the degradation of catalytic activity due to ageing can be substantially decreased. Consequently, the efficiency with which the harmful components contained in the waste gas are removed from said gas can be kept constant over a long period of time.

EXAMPLE 2

A gas mixture consisting of 270 Nm³/hr of waste gas at 390° C emanating from a heating furnace using heavy oil and containing 124 ppm of nitrogen oxides and 1.2 mols, per mol of nitrogen oxides, of ammonia added as reducing agent was fed downwardly to each of 30 parallel passage type box-shaped contact apparatus (actually, 3 such apparatus were used repeatedly to perform 30 test runs), each having the structure described in Example 1, so that the nitrogen oxides are reduced into harmless nitrogen. After this reducing operation had been continued for 12 to 20 days, dust components had deposited on the gauze meshes to the extent that the conversion of nitrogen oxides was found to have fallen from the original value of 93% to 85.0 – 85.7%. Solid particles were the introduced into the various contact apparatus under conditions indicated below. At the end of the operation, the conversion of nitrogen oxides was measured again in the contact apparatus. The results are given in Table 1 to Table 4 below. (a) γ-Alumina particles having various average particle diameters indicated in Table 1 and a fixed density of 0.90 g/cm³ were introduced at a concentration of 140 g/m³ of the current of gas into the corresponding contact apparatus, with the actual linear velocity in the gas-solid contact zone kept at 10.2 m/sec for 20 minutes to effect the removal of dust components. After the treatment, the conversion of nitrogen oxides in the cleaned apparatus was determined using the same waste gas and conditions as before. The results are shown in Table 1.

TABLE 1

|  | Average Particle Diameter (μm) | Conversion of Nitrogen Oxides |
|---|---|---|
| Test Run 1 | 30 | 85.7% |
| Test Run 2 | 50 | 88.0% |
| Test Run 3 | 200 | 91.8% |
| Test Run 4 | 500 | 92.2% |
| Test Run 5 | 1000 | 92.4% |
| Test Run 6 | 2000 | 88.1% |
| Test Run 7 | 2500 | 85.6% |

From these results, it is determined that for the present invention the average particle diameter of solid particles must be selected from the range of 50 to 2000 μm, preferably 200 to 1000 μm.

(b) γ-Alumina particles having an average particle diameter of 855 μm and a density of 0.9 g/cm³ were introduced at a concentration of 140 g/m³ of the current of gas into the contact apparatus described above, with the actual linear velocity kept at various values indicated in Table 2 below for 20 minutes to effect the removal of dust components. The conversion of nitrogen oxides was determined after the treatment using the cleaned apparatus and the same waste gas and conditions as before. The results are shown in Table 2 below.

TABLE 2

|  | Actual linear velocity (m/sec) | Conversion of Nitrogen Oxides |
|---|---|---|
| Test Run 8 | 1 | 85.0% |
| Test Run 9 | 2 | 87.7% |
| Test Run 10 | 5 | 89.9% |
| Test Run 11 | 8 | 92.1% |
| Test Run 12 | 13 | 92.4% |
| Test Run 13 | 15 | 92.4% |

TABLE 2-continued

|  | Actual linear velocity (m/sec) | Conversion of Nitrogen Oxides |
|---|---|---|
| Test Run 14 | 17 | 92.3% |

*In Test Run 14 some erosion was observed on the gauze forming the envelopes.

From the results given above, it is determined for the present invention that the actual linear velocity of the solid particles in the gas-solid contact zone must be selected from the range of 2 to 15 m/sec, preferably 8 to 13 m/sec.

(c) Various types of particles each having an average particle diameter of 850 μm and densities as indicated in Table 3 were introduced at a concentration of 140 g/m³ of the current of gas into the contact apparatus, with the actual linear velocity in the gas-solid contact zone kept at 10.2 m/sec, for 20 minutes to effect the removal of dust components. After the treatment, the conversion of nitrogen oxides was determined by feeding the same waste gas into the cleaned apparatus under the original conditions.

The results are shown in Table 3.

TABLE 3

|  | Substance Composing Solid Particles | Density (g/cm³) | Conversion of Nitrogen Oxides |
|---|---|---|---|
| Test Run 15 | γ-Alumina | 0.80 | 88.2% |
| Test Run 16 | Silica-alumina | 0.90 | 89.5% |
| Test Run 17 | Coal | 1.50 | 91.7% |
| Test Run 18 | Siliceous sand | 2.40 | 91.9% |
| Test Run 19 | Ceramic | 3.10 | 91.3% |
| Test Run 20 | Steel | 7.86 | 89.4% |
| Test Run 21 | Yellow brass | 8.44 | 88.4% |
| Test Run 22 | Soft solder | 8.89 | 88.0% |
| Test Run 23 | Molybdenum | 10.2 | 87.4% |

From these results, it is seen that the density of solid particles is desirably selected from the range of 0.9 to 8.0 g/cm³, preferably 1.0 to 3.1 g/cm³.

(d) γ-Alumina particles having an average particle diameter of 425 μm and a density of 0.90 g/cm³ were introduced at various concentrations indicated in Table 4 into the corresponding contact apparatus, with the actual linear velocity in the gas-solid contact zone kept at 10.2 m/sec for 20 minutes to effect the removal of dust particles. After the treatment, the conversion of nitrogen oxides was determined in the cleaned apparatus as before.

The results are given in Table 4.

TABLE 4

|  | Concentration of Solid Particles (g/m³) | Conversion Of Nitrogen Oxides |
|---|---|---|
| Test Run 24 | 0.5 | 85.3 % |
| Test Run 25 | 1 | 87.9 % |
| Test Run 26 | 20 | 90.7 % |
| Test Run 27 | 100 | 91.7 % |
| Test Run 28 | 150 | 90.0 % |
| Test Run 29 | 200 | 89.1 % |
| Test Run 30 | 300 | 89.1 % |

It is seen from the results given above taht if the concentration of solid particles based on the current of carrier gas is increased to over 200 g/m³, it fails to bring about any additional beneficial effect and, therefore, should desirably be selected from the range of 1 to 200 g/m³, preferably 20 to 100 g/m³, by taking into due account the quantitative economy of solid particles and the ease of recovery of solid particles.

EXAMPLE 3

In the same conditions as used in Example 2, the gas mixture was fed upwardly to a total of seven honeycomb type contact apparatus of the following description to effect reduction of the nitrogen oxides into harmless nitrogen. The contact apparatus each had a honeycomb solid body 2 mm in wall thickness and having gas channels formed by boring 20 parallel holes each of 7.4 mm square at fixed intervals through a square block 200 mm × 200 mm in area and 1100 mm in height. The gas-solid contact zone was formed by depositing ferrous sulfate as the catalyst on the surface of the solid body. This nitrogen oxide reduction was continued for 22 to 30 days. At this time, the conversion of nitrogen oxides was found to have fallen from the initial value of 86% to 74.5 - 75%. Siliceous sand having an average particle diameter of 700 μm and a density of 2.4 g/cm$^3$ was then introduced at a concentration of 40 g/m$^3$ of the current of gas upwardly into the contact apparatus from their lower parts, with the actual linear velocity in the gas-solid contact zone fixed at various values indicated in Table 5 for 20 minutes to effect removal of dust particles. After the removal of dust particles, the conversion of nitrogen oxides in each apparatus was determined again under the same conditions as before.

The results are as shown in Table 5.

TABLE 5

| | Actual Linear Velocity (m/sec) | Conversion of Nitrogen Oxides |
|---|---|---|
| Test Run 31 | 1 | 75.0 % |
| Test Run 32 | 2 | 78.0 % |
| Test Run 33 | 3 | 79.1 % |
| Test Run 34 | 8 | 84.3 % |
| Test Run 35 | 13 | 85.6 % |
| Test Run 36 | 15 | 84.1 % |
| Test Run 37 | 17 | 84.0 % |

From the results, it is seen that even in the case of honeycomb type contact apparatus, deposited dust particles can thoroughly be removed by carrying out the treatment according to the method of this invention. It is also confirmed that the actual linear velocity in the gas-solid contact zone is suitably within the range of 2 to 15 m/sec, preferably 8 to 13 m/sec.

What is claimed is:

1. A method for removal of dust deposited on the interior of a contact apparatus which is used to remove harmful components from waste gas emanating from a stationary source and which has a gas-solid contact zone with a plurality of parallel gas channels formed between a plurality of solid bodies that contain an active component for removing harmful components from said waste gas, comprising flowing in free motion through the interior of said apparatus solid particles of average particle diameter of 50 to 2000 μm suspended in a current of a carrier gas at a concentration of solid particles from 20 to 100 g/m$^3$, the actual linear velocity of said carrier gas within said contact apparatus and in said gas-solid contact zone being from 2 to 15 m/sec and removing the particles and dust with the gas leaving the apparatus.

2. A method according to claim 1, wherein said contact apparatus is a parallel passage type contact apparatus wherein said gas-solid contact zone has gas channels formed between a plurality of parallel solid bodies, said solid body consisting of a gauze envelope packed with solid materials including said active component.

3. A method according to claim 2, wherein each said envelope has the shape of a rectangular parallelepiped or cylinder.

4. A method according to claim 2, wherein each said envelope has a thickness of from 3 to 10 mm.

5. A method according to claim 2, wherein each said gas channel has a width between adjacent parallel envelopes of from 3 to 20 mm.

6. A method according to claim 2, wherein the said gauze has openings of from 9 to 48 Tyler mesh.

7. A method according to claim 1, wherein said contact apparatus is a honeycomb type contact apparatus wherein said gas-solid contact zone has gas channels formed by boring a plurality of parallel voids each of the shape of a column with a circular, square or polygonal cross-section through a cylindrical or rectangular columnar solid body, said active component being present at least on the surface of said bores defining said gas channels.

8. A method according to claim 7, wherein the hydraulic diameter of said voids is from 3 to 20 mm.

9. A method according to claim 1, wherein said dust contains components selected from the group consisting of V$_2$O$_5$, Na$_2$O, Fe$_2$O$_3$, SiO$_2$, Al$_2$O$_3$, CaO, NiO, SO$_3$ and carbon.

10. A method according to claim 1, wherein said solid particles have an average particle diameter of from 200 to 1000 μm.

11. A method according to claim 1, wherein said solid particles have a density of from 0.9 to 8.0 g/cm$^3$.

12. A method according to claim 11, wherein the density of said solid particles is from 1.0 to 3.1 g/cm$^3$.

13. A method according to claim 1, wherein said solid particles are selected from particles of the group consisting of iron, glass, alumina and silica.

14. A method according to claim 1, wherein the said actual linear velocity of said current of said carrier gas is from 10 to 30 m/sec prior to entry into said contact apparatus.

15. A method according to claim 1, wherein said actual linear velocity of said current of said carrier gas in the gas-solid contact zone is from 8 to 13 m/sec.

16. A method according to claim 1, wherein said concentration of solid particles is from 20 to 100 g/m$^3$.

17. A method according to claim 1, wherein said carrier gas is said waste gas containing harmful components.

18. A method according to claim 17, wherein said solid particles are introduced into said waste gas while said process for the removal of harmful components contained in said waste gas is being operated.

19. A method for the removal of dust particles deposited on the interior of a contact apparatus which is used in a dry process for the removal of harmful components selected from the group consisting of sulfur oxides, nitrogen oxides and a mixture of sulfur oxides and nitrogen oxides from waste gas, said contact apparatus comprising a gas-solid contact zone having a plurality of parallel gas channels formed between a plurality of solid bodies containing an active component for removing said harmful components, wherein:

(a) solid particles having an average particle diameter of from 200 to 1000 μm and a density of from 1.0 to 3.1 g/cm$^3$ are introduced into said waste gas upstream of said gas-solid contact zone, (b) said solid particles are introduced into the contact apparatus at a concentration of from 20 to 100 g/m³ with respect to the current of said waste gas, (c) the actual linear velocity of said waste gas is maintained at from 8 to 13 m/sec within said gas-solid contact zone, and (d) said waste gas which has flowed through the said gas-solid contact zone is released from the system and at the same time said solid particles are withdrawn from said treated waste gas and then recycled for introduction to said waste gas upstream of said gas-solid contact zone, whereby removal of said dust particles is efffected without interruption of said process for removing harmful components from said waste gas.

20. In a process for removal of harmful components from a waste gas which passes through a contact apparatus having a gas-solid contact zone having a plurality of parallel gas channels formed between a plurality of solid bodies which contain an active component for removing said harmful components, the improvement comprising introducing solid particles into said waste gas upstream of said gas-solid contact zone, said solid particles having an average diameter of 50 to 2000 μm so that said solid particles pass in free motion through said gas-solid contact zone, the actual linear velocity of said waste gas being controlled at 2 to 15 m/sec within said gas-solid contact zone, and removing both the dust particles deposited from said waste gas on said contact apparatus and the solid particles with the gas leaving the apparatus to maintain the efficiency of said process for removal of harmful components with interruption thereof.

21. A method according to claim 20, wherein said active component is active for removal of harmful components selected from the group consisting of sulfur oxides, nitrogen oxides and mixtures thereof.

* * * * *